(12) United States Patent  
Eom et al.

(10) Patent No.: US 8,774,303 B2  
(45) Date of Patent: Jul. 8, 2014

(54) WIRELESS COMMUNICATION METHOD AND APPARATUS USING ADAPTIVE TRANSMISSION POLARIZATION CONTROL

(75) Inventors: Soon Young Eom, Daejeon (KR); Soon Ik Jeon, Daejeon (KR); Young Jun Chong, Daejeon (KR); Jae Ick Choi, Daejeon (KR); Cheol Mun, Suwon-si (KR)

(73) Assignees: Electronics and Telecommunications Research Institute, Daejeon (KR); Industrial Cooperation Foundation, Korea National University of Transportation, Daejeon (KR)

( * ) Notice: Subject to any disclaimer, the term of this patent is extended or adjusted under 35 U.S.C. 154(b) by 0 days.

(21) Appl. No.: 13/534,431

(22) Filed: Jun. 27, 2012

(65) Prior Publication Data

US 2013/0003789 A1 Jan. 3, 2013

(30) Foreign Application Priority Data

Jun. 29, 2011 (KR) ........................ 10-2011-0063717  
May 31, 2012 (KR) ........................ 10-2012-0057866

(51) Int. Cl.  
*H04B 7/10* (2006.01)  
*H04B 7/02* (2006.01)

(52) U.S. Cl.  
USPC ............. 375/267; 375/260; 375/259; 455/69; 455/68; 455/39; 455/101; 455/91; 342/188; 342/175

(58) Field of Classification Search  
USPC ................. 455/450, 590, 39, 91, 101, 575.7, 455/575.1, 550.1, 73, 562.1, 561, 422.1, 455/403, 507, 500, 69, 68; 375/267, 260, 375/259, 95, 299; 342/175, 188  
See application file for complete search history.

(56) References Cited

U.S. PATENT DOCUMENTS

| | | | |
|---|---|---|---|
| 6,697,643 B1 * | 2/2004 | Hagerman et al. ......... | 455/562.1 |
| 8,306,473 B2 * | 11/2012 | Anreddy et al. ................ | 455/39 |
| 2009/0227260 A1 * | 9/2009 | Anreddy et al. .............. | 455/450 |
| 2011/0019573 A1 * | 1/2011 | Ezri ............................... | 370/252 |
| 2011/0064156 A1 * | 3/2011 | Kim et al. ..................... | 375/267 |
| 2011/0080969 A1 * | 4/2011 | Jongren et al. ................ | 375/267 |

* cited by examiner

*Primary Examiner* — Chieh M Fan  
*Assistant Examiner* — Michelle M Koeth  
(74) *Attorney, Agent, or Firm* — William Park & Associates Patent Ltd.

(57) ABSTRACT

A wireless communication method and apparatus using adaptive transmission polarization control are provided. The wireless communication apparatus includes an orthogonal polarization antenna, a channel state estimator, and a transmission polarization state (TPS) selector. The orthogonal polarization antenna receives at least one reference signal. The channel state estimator estimates a wireless polarization channel on the basis of the reference signal. The TPS selector selects a TPS corresponding to the estimated wireless polarization channel from among a plurality of predefined TPSs, and feeds back the selected TPS information. Accordingly, the wireless communication apparatus feeds back information for polarization control using minimum uplink wireless resources, and maximizes a transmission capacity on the basis of the feedback information.

17 Claims, 8 Drawing Sheets

FIG. 6
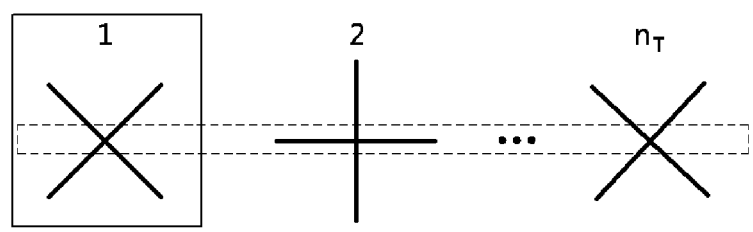
(a) TRANSMISSION ARRAY ANTENNA
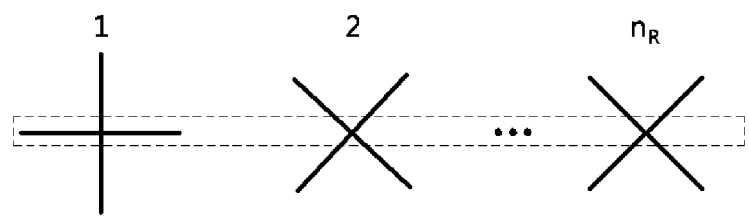
(b) RECEPTION ARRAY ANTENNA

WIRELESS COMMUNICATION METHOD AND APPARATUS USING ADAPTIVE TRANSMISSION POLARIZATION CONTROL

CLAIM FOR PRIORITY

This application claims priority to Korean Patent Application No. 10-2011-0063717 filed on Jun. 29, 2011 and No. 10-2012-0057866 filed on May 31, 2012 in the Korean Intellectual Property Office (KIPO), the entire contents of which are hereby incorporated by reference.

BACKGROUND

1. Technical Field

Example embodiments of the present invention relate in general to a wireless communication system and more specifically to a wireless communication method and apparatus using adaptive transmission polarization control, which maximize efficiency in using wireless resources.

2. Related Art

Wireless resources used in a general mobile communication system include frequency, space, time, polarization, etc. At present, mobile communication systems use orthogonal frequency division multiple access (OFDMA) technology, multiple-input multiple-output (MIMO) technology, and time division multiple access (TDMA) technology for efficiently using wireless resources such as frequency, space, time, etc.

However, in order to satisfy the exponentially increasing demand for wireless data, it is necessary to develop additional wireless resources other than the existing frequency, space, and time resources, and efficiently use the resources.

Therefore, it is becoming increasingly necessary to develop technology that increases a transmission capacity by more actively using a polarization resource, which is restrictively used in existing mobile communication systems, as in polarization diversity.

A wireless channel causes polarization spread (PS) in which a signal transmitted by a transmission apparatus in a certain polarization mode is changed to various polarization modes by multi-path fading and transferred to a reception apparatus.

Moreover, when the polarization of a transmission signal transferred to a reception apparatus is not matched with a polarization mode of a reception apparatus antenna, polarization mismatch loss (PML) occurs.

Existing mobile communication systems obtain a diversity gain using polarization diversity in a wireless channel environment where PS is very severe, but performance is degraded by PML in a wireless channel environment where PS is not severe. Therefore, a method is required for improving a transmission capacity and minimizing the degradation of performance due to PS and PML that occur in a wireless channel.

To prevent distortion such as PS and PML that occur in a wireless channel, a precoding technique is required in which a transmission apparatus distorts a transmission signal in advance and transmits the distorted signal to minimize channel distortion. To precode a transmission signal, a transmission apparatus and a reception apparatus need to know polarization channel state information (PCSI) therebetween in advance.

In a downlink especially, a transmission apparatus (for example, a base station) needs to know downlink PCSI from a transmission antenna of the transmission apparatus to a reception antenna of a terminal in advance.

In a wireless communication system using frequency division duplexing (FDD), a downlink and an uplink use different frequency bands, and thus, in order for a transmission apparatus to know PCSI of the downlink in advance, a reception apparatus needs to estimate a downlink polarization channel state and feedback-transfer the estimated downlink polarization channel state to the transmission apparatus.

A reception apparatus needs many uplink resources for feeding back PCSI to a transmission apparatus, and thus, an effective feedback method that transfers PCSI to the transmission apparatus using minimum feedback information is required.

However, considering the development direction of mobile communication systems, the number of transmission antennas inevitably increases for MIMO technology, and thus, PCSI that a reception apparatus needs to feed back to a transmission apparatus is predicted to rapidly increase.

Accordingly, feedback technology for transferring PCSI to a transmission apparatus using only limited feedback information is required.

SUMMARY

Accordingly, example embodiments of the present invention are provided to substantially obviate one or more problems due to limitations and disadvantages of the related art.

Example embodiments of the present invention provide a wireless communication apparatus which feeds back information for polarization control using minimum uplink wireless resources, and maximizes a transmission capacity on the basis of the feedback information.

Example embodiments of the present invention also provide a wireless communication method using adaptive transmission polarization control which feeds back information for polarization control using minimum uplink wireless resources, and maximizes a transmission capacity on the basis of the feedback information.

In some example embodiments, a wireless communication apparatus includes: an orthogonal polarization antenna configured to receive at least one reference signal; a channel state estimator configured to estimate a wireless polarization channel on the basis of the reference signal; and a transmission polarization state (TPS) selector configured to select a TPS corresponding to the estimated wireless polarization channel from among a plurality of predefined TPS, and feed back information on the selected TPS.

The TPS selector may select a TPS in which a data transmission rate is the maximum, from among the plurality of TPSs, and feed back an indicator having the selected TPS.

The wireless communication apparatus may further include a channel state information estimator configured to calculate a receivable data transmission rate or SINR using the selected TPS, and feed back the calculated SINR or data transmission rate as channel state information.

Each of the predefined TPSs may be configured with a plurality of polarization state matrixes.

The TPS selector may select one polarization state matrix from among the polarizations state matrixes, and select one of two orthogonal polarization vectors which configure the selected one polarization state matrix.

The TPS selector may feed back an index indicating the selected polarization state matrix and an index indicating the selected polarization vector.

In other example embodiments, a wireless communication apparatus includes: at least one orthogonal polarization antenna configured to receive at least one reference signal; a channel state estimator configured to estimate a space and polarization channel on the basis of the reference signal; and a space and polarization weight selector configured to select a space and polarization weight corresponding to the estimated space and polarization channel from a predefined space and polarization weight vector codebook, and feed back the selected space and polarization weight information.

The predefined space and polarization weight vector codebook may be formed by combining a polarization state matrix set and a precoder codebook for SDMA.

The space and polarization weight selector may feed back an index corresponding to the polarization weight vector selected from the space and polarization weight vector codebook and an index corresponding to the selected space weight vector.

In still other example embodiments, a wireless communication apparatus includes: a scheduler configured to select at least one reception apparatus on the basis of at least one of channel quality information and TPS information received from at least one reception apparatus, and determine a modulation and coding scheme for a signal to be transmitted to the selected at least one reception apparatus; a coding and modulation unit configured to perform coding and modulation to generate a transmission layer to be transmitted to the at least one reception apparatus, on the basis of the determined coding and modulation scheme for the selected at least one reception apparatus; a TPS controller configured to control polarization of the transmission layer to be transmitted to the selected at least one reception apparatus on the basis of the TPS information received from the selected at least one reception apparatus; and at least one orthogonal polarization antenna configured to irradiate the at least one polarization-controlled transmission layer through two orthogonal linear polarization antenna elements, the at least one orthogonal polarization antenna including the two orthogonal linear polarization antenna elements.

The scheduler may select two terminals in which a transmission rate sum of data for simultaneously transmitting is the maximum on the basis of channel quality information and TPS information received from a plurality of reception apparatuses, and transmit data, which will be respectively transmitted to the selected two terminals simultaneously, to two orthogonal linear polarization antenna elements which configure one orthogonal polarization antenna.

The scheduler may select a plurality of terminals in which a transmission rate sum of data for simultaneously transmitting is the maximum on the basis of channel quality information and TPS information received from a plurality of reception apparatuses, the number of selected terminals being twice the number of orthogonal polarization antennas.

In still other example embodiments, a wireless communication method includes: estimating a wireless polarization channel on the basis of a received reference signal; selecting a TPS from among a plurality of predefined TPSs on the basis of the estimated wireless polarization channel; and transmitting indication information indicating the selected TPS.

Each of the predefined TPSs may be configured with a plurality of polarization state matrixes.

The indication information indicating the TPS may include index information indicating the selected polarization state matrix among the plurality of polarization state matrixes, and index information indicating the selected polarization vector.

In still other example embodiments, a wireless communication method includes: estimating a space and polarization channel on the basis of at least one received reference signal; selecting a space and polarization weight corresponding to the estimated space and polarization channel from a predefined space and polarization weight vector codebook; and transmitting the selected space and polarization weight information.

In still other example embodiments, a wireless communication method includes: selecting at least one reception apparatus on the basis of at least one of channel quality information and TPS information received from at least one reception apparatus; determining a modulation and coding scheme for a signal to be transmitted to the selected at least one reception apparatus; performing coding and modulation to generate a transmission layer to be transmitted to the at least one reception apparatus, on the basis of the determined coding and modulation scheme for the selected at least one reception apparatus; controlling polarization of the transmission layer to be transmitted to the selected at least one reception apparatus on the basis of the TPS information received from the selected at least one reception apparatus; and transmitting the at least one polarization-controlled transmission layer using orthogonal linear polarization.

BRIEF DESCRIPTION OF DRAWINGS

Example embodiments of the present invention will become more apparent by describing in detail example embodiments of the present invention with reference to the accompanying drawings, in which:

FIG. 6 is an exemplary diagram illustrating a configuration of an array antenna of a base station which performs space and polarization division multiple access (SPDMA) according to another embodiment of the present invention;

DESCRIPTION OF EXAMPLE EMBODIMENTS

Figure 1:
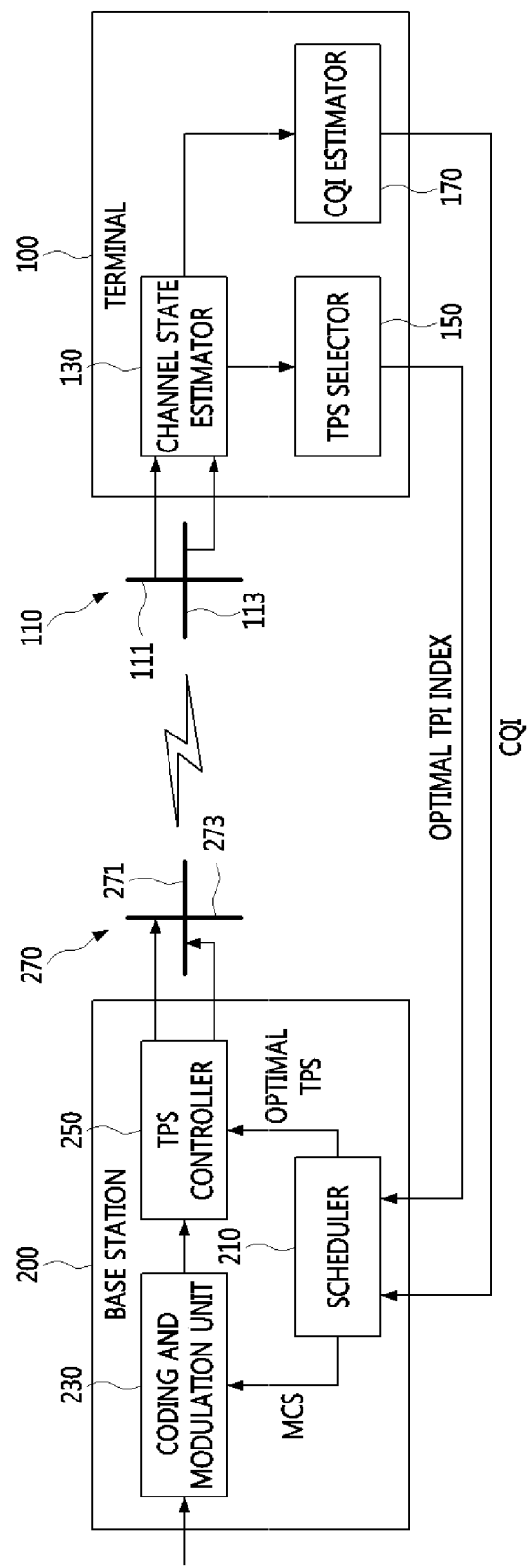
FIG. 1 is a block diagram illustrating a configuration of a wireless communication apparatus according to an embodiment of the present invention.

The invention may have diverse modified embodiments, and thus, example embodiments are illustrated in the drawings and are described in the detailed description of the invention.

However, this does not limit the invention within specific embodiments and it should be understood that the invention covers all the modifications, equivalents, and replacements within the idea and technical scope of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A terminal used in the specification may be referred to as user equipment (UE), a mobile station (MS), a relay node (RN), a machine type communication (MTC) device, a mobile terminal (MT), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile, or the other terms.

Moreover, a base station used in the specification may be called the other terms such as a base station, a node-B, an eNode-B, a base transceiver system (BTS), an access point, a transmission point, etc.

Hereinafter, example embodiments of the present invention will be described in detail with reference to the accompanying drawings. Like numbers refer to like elements throughout the description of the figures, and a repetitive description on the same element is not provided.

In a wireless communication method using adaptive transmission polarization control according to an embodiment of the present invention, a polarization matching method in which feedback information is received using limited uplink feedback information in a wireless communication system using polarization of a transmission signal, and the polarization of the transmission signal is optimally matched with a downlink channel state on the basis of the received feedback information is provided.

Moreover, in a wireless communication method using adaptive transmission polarization control according to another embodiment of the present invention, a polarization division multiple access (PDMA) method in which data is simultaneously transmitted to two terminals using orthogonal polarizations on the basis of the polarization matching method, thus increasing the downlink transmission capacity of the wireless communication system, is provided.

Moreover, in a wireless communication method using adaptive transmission polarization control according to another embodiment of the present invention, an SPDMA method in which the PDMA method and a space division multiple access (SDMA) method are optimally combined in a wireless communication system including a transmission apparatus and a reception apparatus which include an orthogonal polarization array antenna is provided.

Hereinafter, a polarization matching method using limited feedback information in a wireless communication method using adaptive transmission polarization control according to an embodiment of the present invention will be described in detail.

FIG. 1 is a block diagram illustrating a configuration of a wireless communication apparatus according to an embodiment of the present invention, and exemplarily illustrates a terminal and a base station that perform adaptive transmission polarization control using limited uplink feedback information.

Figure 2:
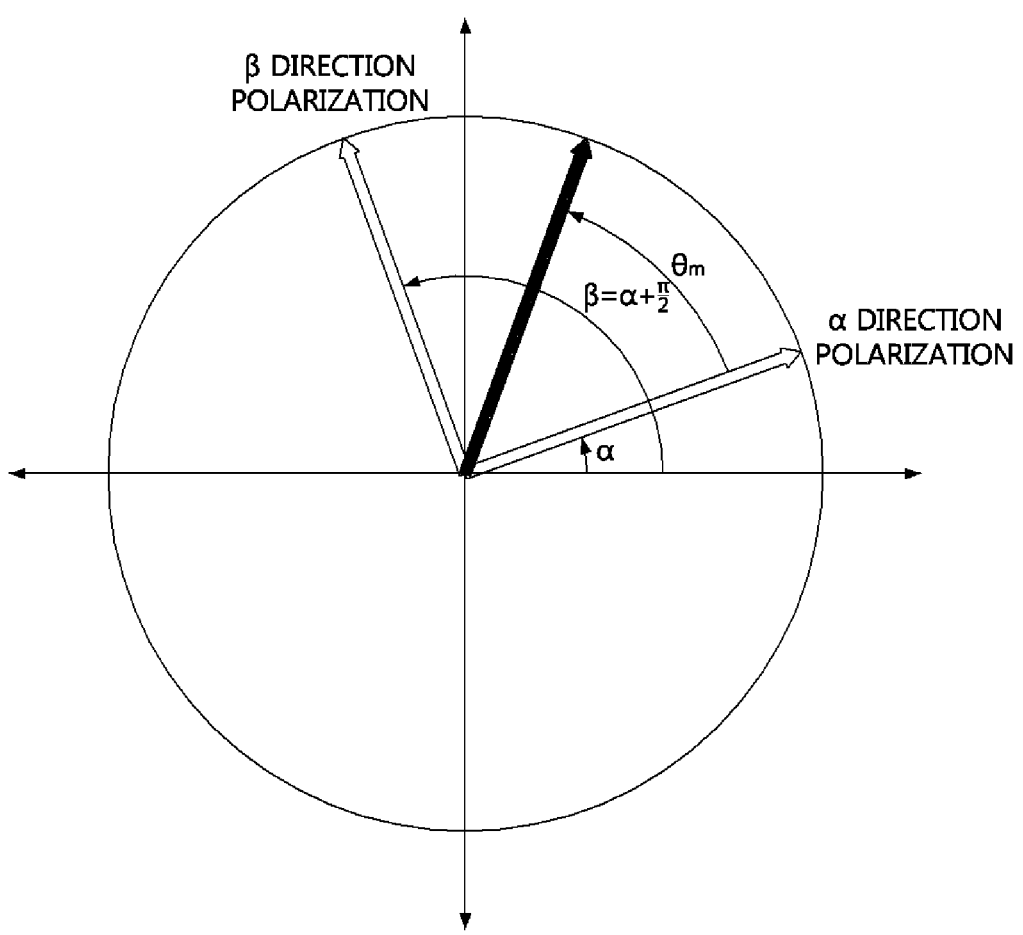
FIG. 2 is a conceptual diagram for describing the determination of a weight for transmission polarization control in a wireless communication apparatus according to an embodiment of the present invention.

FIG. 2 is a conceptual diagram for describing the determination of a weight for transmission polarization control in a wireless communication apparatus according to an embodiment of the present invention.

Referring to FIGS. 1 and 2, first, a terminal 100 includes an orthogonal polarization antenna 110, a channel state estimator 130, a transmission polarization state (TPS) selector 150, and a channel quality information (CQI) estimator 170.

Hereinafter, for convenience of a description, it is assumed that the terminal 100 of FIG. 1 is a $k^{th}$ terminal 100 of a plurality of terminals that are located in a cell operated and managed by a base station 200.

The orthogonal polarization antenna 110 may be configured with two orthogonal linear polarization antenna elements 111 and 113. The orthogonal polarization antenna 110 receives two orthogonal linear polarization signals transmitted from the base station 200 and supplies the received signals to the channel state estimator 130. Here, the two orthogonal linear polarization signals transmitted from the base station 200 may undergo multi-path fading of a wireless channel and then may be received through the orthogonal polarization antenna 110 of the terminal 100.

The terminal 100 may use one linear polarization antenna element or two orthogonal linear polarization antenna elements in the orthogonal polarization antenna 110 for receiving a signal. When the terminal 100 receives a signal using the two orthogonal linear polarization antenna elements 111 and 113, a wireless channel between the $k^{th}$ terminal 100 and the base station 200 may be expressed as Equation (1).

$$H_k = \begin{bmatrix} h_k^{\gamma_k \alpha} & h_k^{\gamma_k \beta} \\ h_k^{\omega_k \alpha} & h_k^{\omega_k \beta} \end{bmatrix} \quad (1)$$

where $h_k^{xy}$ denotes a downlink wireless channel through which a signal transmitted through a y-direction orthogonal linear polarization antenna element 273 of the base station 200 passes in an operation in which the signal is received through the x-direction orthogonal linear polarization antenna element 113 of the $k^{th}$ terminal 100. Also, α-direction transmission polarization and β-direction transmission polarization are orthogonal, and $\gamma_k$-direction reception polarization and $\omega_k$-direction reception polarization of the $k^{th}$ terminal 100 are orthogonal.

A channel matrix "$H_k$" expressed in Equation (1) includes PS that occurs in a wireless channel and mismatching between transmission polarization and reception polarization. To solve PS occurring in a downlink wireless channel and mismatching between transmission and reception polarizations, it is necessary to know a downlink polarization channel state between the base station 200 and each of a plurality of terminals 100.

The channel state estimator 130 estimates a downlink polarization channel matrix expressed as Equation (1) on the basis of a signal supplied from the orthogonal polarization antenna 110. To this end, the base station 200 respectively transmits two different reference signals through two orthogonal linear polarization antenna elements 271 and 273. The terminal 100 respectively receives the two reference signals through the two orthogonal linear polarization antenna elements 111 and 113, and estimates the downlink polarization channel matrix expressed as Equation (1).

The TPS selector 150 of the k<sup>th</sup> terminal 100 determines an optimal TPS in a TPS set "$\mathcal{P}$" using the downlink polarization channel matrix "$H_k$" estimated by the channel state estimator 130. The terminal 100 transmits the determined optimal TPS information to the base station 100 over a feedback channel.

Here, the amount of uplink feedback information transmitted by each terminal 100 is limited, and thus, the terminal 100 needs to feed back the optimal TPS information to the base station 200 using the limited feedback information.

In an embodiment of the present invention, the base station 200 and all the terminals in the cell preappoint a TPS set configured with a plurality of transmittable TPSs. The terminal 100 selects an optimal TPS, enabling a downlink transmission capacity to be the maximum, from the preappointed TPS set and transmits an index of the optimal TPS selected from the TPS set to the base station 200. A TPS may be expressed vector p having a 2×1 size as Equation (2).

$$p = \begin{bmatrix} p_\alpha \\ p_\beta \end{bmatrix} = \begin{bmatrix} \cos\theta \\ \sin\theta \end{bmatrix} \quad (2)$$

where $p_\alpha$ and $p_\beta$ are complex-number weights for determining the sizes and phases of an α-direction polarization signal and a β-direction polarization signal that are orthogonal to each other and are irradiated from the orthogonal polarization antenna 270 of the base station 200, respectively. $\|p\|=1$, and $p_\alpha$ and $p_\beta$ are respectively determined as $\cos\theta$ and $\sin\theta$.

Hereinafter, a weight determination method using transmission polarization control according to an embodiment of the present invention will be described in further detail with reference to FIG. 2.

In FIG. 2, θ indicates the movement of an angle that is intended to rotate with an a polarization direction as a reference point. When θ=0, θ indicates α-direction polarization. When θ=π/2, θ indicates β-direction polarization. When θ=π, θ indicates the same polarization as α-direction polarization.

Therefore, to represent M transmittable TPSs (having an uniform interval), M of $\{\theta_m\}_{m=1,\ldots,M}$ may be determined as expressed in Equation (3).

$$\theta_m = (m-1) \cdot \Delta\theta, \text{ where } m = 1, \ldots, M \text{ and } \Delta\theta = \frac{\pi}{M} \quad (3)$$

A TPS set "$\mathcal{P}$" including M transmittable TPSs that the base station 200 and the terminals 100 have preappointed may be expressed as a set of M vectors "$\{p_m\}_{m=1,\ldots,M}$" as expressed in Equation (4) using Equations (2) and (3).

$$\mathcal{P} = \{p_1, p_2, \ldots, p_M\} \quad (4)$$

Moreover, A TPS set "$\mathcal{P}$" including M of $\{\theta_m\}_{m=1,\ldots,M}$ may be expressed as a set in a quantized transmission polarization direction as expressed in Equation (5).

$$\mathcal{P} = \{\theta_1, \theta_2, \ldots, \theta_M\} \quad (5)$$

Referring again to FIG. 1, the TPS selector 150 of the k<sup>th</sup> terminal 100 determines an optimal TPS index "$m_k$" to optimally meet a selection reference that is given in the TPS set "$\mathcal{P}$". For example, when the terminal 100 selects a TPS in which downlink transmission power is the maximum, the optimal TPS index "$m_k$" of the k<sup>th</sup> terminal 100 may be determined as expressed in Equation (6).

$$m_k = \arg\max_{m \in \{1,2,\ldots,M\}} \|H_k p_m\|^2 \quad (6)$$

An optimal TPS "$p_{m_k}$" determined as expressed in Equation (6) is equivalent to a vector closest to a largest singular vector "$v_k$" of a polarization channel matrix "$H_k$" being selected from the TPS set "$\mathcal{P}$" as expressed in Equation (7)

$$m_k = \arg\min_{m \in \{1,2,\ldots,M\}} \text{dist}(v_k, p_m) \quad (7)$$

The TPS selector 150 of the k<sup>th</sup> terminal 100 feeds back the index "$m_k$" of the selected optimal TPS to the base station 200.

Moreover, the CQI estimator 170 of the kth terminal 100 calculates a receivable signal to interference and noise ratio (SINR) using the selected optimal TPS, and transmits the SINR as CQI to the base station 200 over the feedback channel. The base station 200 may include a scheduler 210, a coding and modulation unit 230, a TPS controller 250, and an orthogonal polarization antenna 270.

The scheduler 210 selects one terminal (for example, the k<sup>th</sup> terminal 100) "k*" in which scheduling priority is the maximum, on the basis of the optimal TPS index information and CQI that are fed back from each terminal 100, and determines a modulation and coding scheme (MCS) for a layer that will be transmitted to the k<sup>th</sup> terminal 100.

The coding and modulation unit 230 codes and modulates scheduled data of the terminal to generate a symbol according to the MCS determined by the scheduler 210, and supplies a transmission layer, which is configured with a plurality of generated symbols, to the TPS controller 250.

The TPS controller 250 controls the amplitude and phase of a signal supplied to the two orthogonal linear polarization antenna elements 271 and 273 such that the transmission layer supplied from the coding and modulation unit 230 is transmitted as the optimal TPS to the k<sup>th</sup> terminal 100, thereby enabling the generation of two orthogonal linear polarization signals having a desired polarization direction. Such a transmission polarization control operation may be performed through baseband signal processing, and an operation of multiplying a symbol "x" of the transmission layer by the optimal TPS "$p_{m_{k^*}}$" of the k<sup>th</sup> terminal 100 may be expressed as Equation (8).

$$s = p_{m_{k^*}} x \quad (8)$$

In the orthogonal polarization antenna 270 of the base station 200, a first element of a vector "s" is transmitted through the α-direction polarization antenna element, and a second element of the vector "s" is transmitted through the β-direction polarization antenna element.

The orthogonal polarization antenna 270 is configured with the two orthogonal linear polarization antenna elements 271 and 273, which separately receive an input signal to generate two orthogonal linear polarizations according to the irradiation structure of an antenna.

Figure 3:
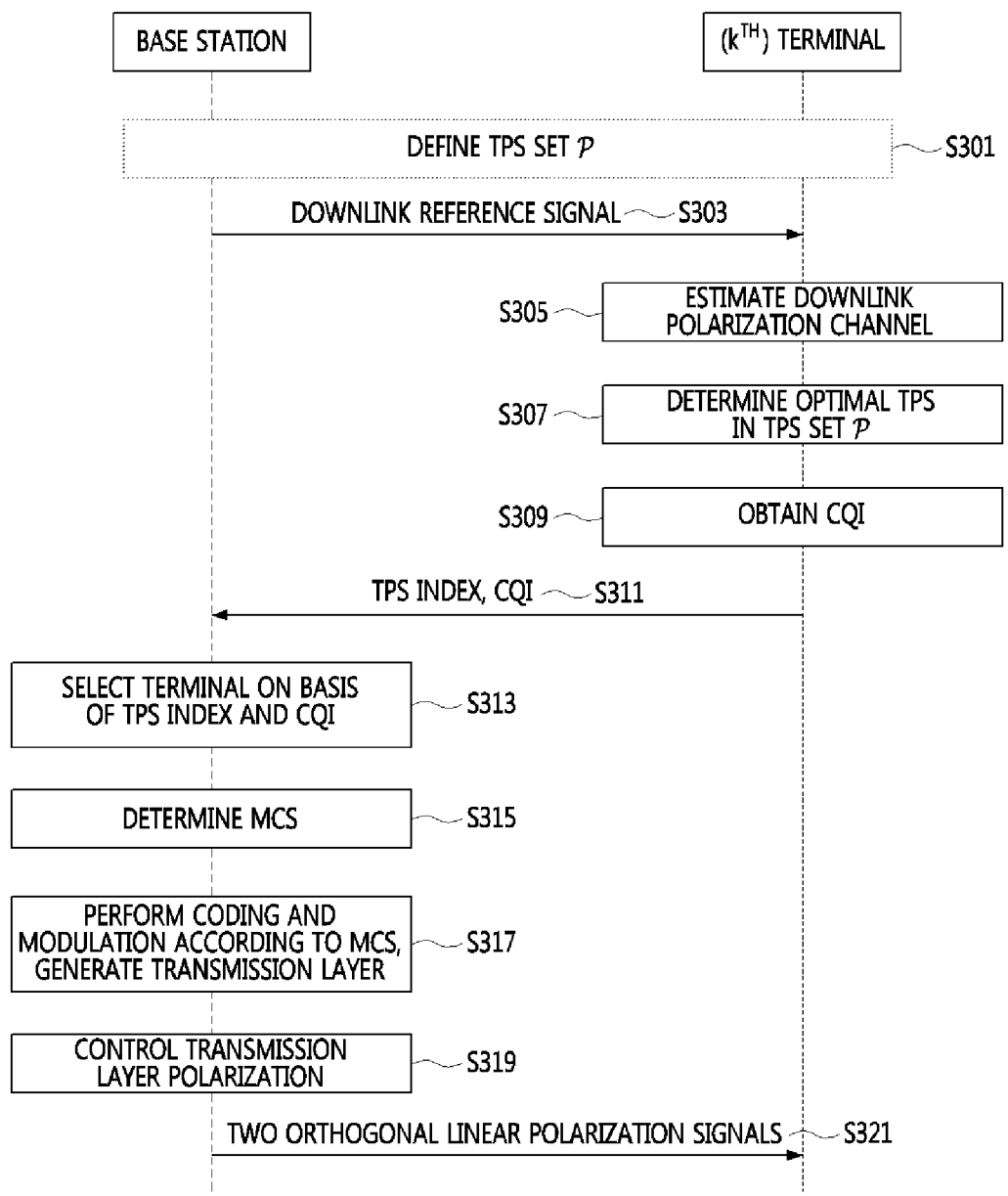
FIG. 3 is a flowchart illustrating a wireless communication method using adaptive transmission polarization control according to an embodiment of the present invention.

FIG. 3 is a flowchart illustrating a wireless communication method using adaptive transmission polarization control according to an embodiment of the present invention.

Referring to FIG. 3, first, the base station 200 and all the terminals 100 in the cell preappoint the TPS set "$\mathcal{P}$" including a plurality of transmittable TPSs, in operation S301.

In operation S303, the base station 200 respectively transmits different reference signals "RS" to all the terminals 100 in the cell through the two orthogonal linear polarization antenna elements to estimate the downlink polarization channel of each terminal 100.

In operation S305, the terminal 100 receives one of the reference signals respectively transmitted though different orthogonal linear polarization antenna elements from the base station 200, and estimates the downlink polarization channel expressed in Equation (1) on the basis of the received reference signal.

Subsequently, the terminal 100 determines an optimal TPS in the TPS set "$\mathcal{P}$" on the basis of the estimated downlink polarization channel in operation S307.

Moreover, the terminal 100 calculates a receivable SINR using the selected optimal TPS, and obtains CQI on the basis of the SINR in operation S309.

Subsequently, the terminal 100 transmits CQI and optimal TPS index information, corresponding to the selected optimal TPS to the base station 200 over an uplink feedback channel in operation S311.

In operation S313, the base station 200 selects one terminal (for example, the $k^{th}$ terminal 100) in which scheduling priority is the maximum on the basis of the optimal TPS index information and CQI that are fed back from each terminal 100, and in operation S315 determines an MCS for a layer that will be transmitted to the $k^{th}$ terminal 100.

Then, the base station 200 performs coding and modulation to generate a symbol according to the determined MCS, and configures a transmission layer with a plurality of generated symbols in operation S317.

In operation S319, the base station 200 precodes signals supplied to the two orthogonal linear polarization antenna elements to generate two orthogonal linear polarization signals having a desired polarization direction, such that the configured transmission layer is transmitted as the optimal TPS to the $k^{th}$ terminal 100.

Subsequently, the base station 200 transmits the two orthogonal linear polarization signals to the $k^{th}$ terminal 100 through the orthogonal polarization antenna in operation S321.

Hereinafter, a PDMA method in which data is simultaneously transmitted to two terminals using orthogonal polarizations will be described as a wireless communication method using adaptive transmission polarization control according to another embodiment of the present invention with reference to FIGS. 4 and 5.

Figure 4:
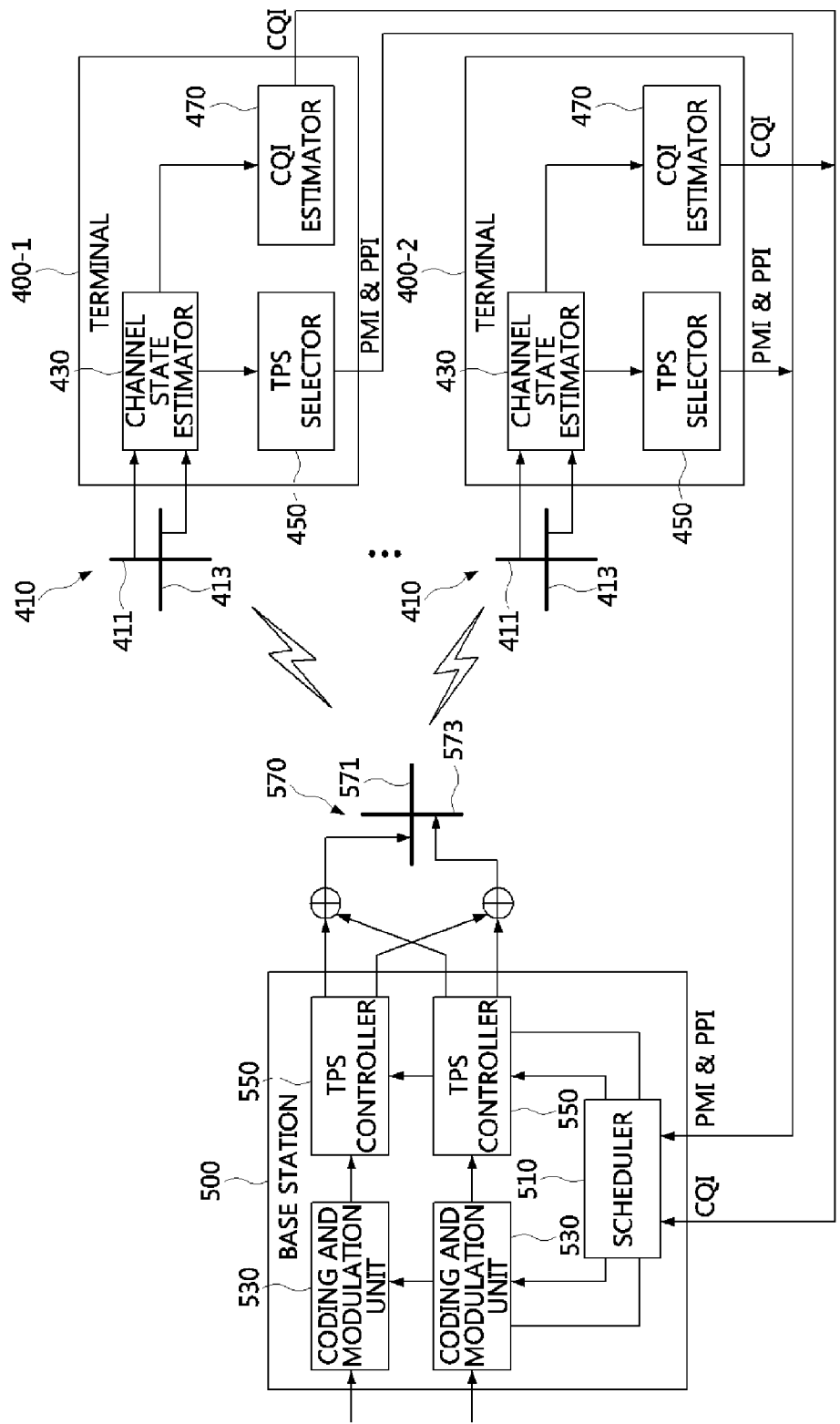
FIG. 4 is a block diagram illustrating a configuration of a wireless communication apparatus according to another embodiment of the present invention.

FIG. 4 is a block diagram illustrating a configuration of a wireless communication apparatus according to another embodiment of the present invention.

Referring to FIG. 4, a base station 500 simultaneously transmits downlink data to two terminals 400-1 and 400-2 through two variable orthogonal linear polarizations that are simultaneously transmitted. Here, the base station 500 optimally matches a TPS of each of the simultaneously transmitted transmission polarizations with a downlink channel to the two terminals 400-1 and 400-2 that receive data through corresponding polarization. The base station 500 selects the two terminals 400-1 and 400-2 for receiving data from among a plurality of terminals in a cell such that the transmission rate sum of the two terminals 400-1 and 400-2 receiving two polarization signals is the maximum, and simultaneously determines the optimal TPSs of the two selected terminals 400-1 and 400-2.

Each of a plurality of terminals that are located in a cell operated and managed by the base station 500 includes an orthogonal polarization antenna 410, a channel state estimator 430, a TPS selector 450, and a CQI estimator 470.

The orthogonal polarization antenna 410 of each terminal may be configured with two orthogonal linear polarization antenna elements 411 and 413. The orthogonal polarization antenna 410 receives reference signals "RS" respectively transmitted through the two orthogonal linear polarization antenna elements 411 and 413, and supplies the reference signals to the channel state estimator 430. Here, two orthogonal linear polarization signals transmitted from the base station 500 may undergo multi-path fading of a wireless channel and then may be received through the orthogonal polarization antenna 410 of the terminal 400-1 or 400-2.

Each terminal may use one linear polarization antenna element or two orthogonal linear polarization antenna elements in the orthogonal polarization antenna 410 to receive a signal. When each terminal receives a signal using the two orthogonal linear polarization antenna elements 411 and 413, a wireless channel between a $k^{th}$ terminal 400-1 or 400-2 and the base station 500 may be expressed as in Equation (1).

The channel state estimator 430 of each terminal estimates a downlink polarization channel matrix expressed on the basis of a reference signal "RS" supplied from the orthogonal polarization antenna 410, and supplies the estimated downlink polarization channel matrix information to the TPS selector 450.

The TPS selector 450 of each terminal determines an optimal TPS capable of being optimally matched with a downlink channel of each terminal, on the basis of the downlink polarization channel matrix information of each terminal that is supplied from the channel state estimator 430.

In PDMA according to another embodiment of the present invention, the base station 500 simultaneously transmits data to the two terminals 400-1 and 400-2 through two orthogonal polarizations capable of being simultaneously transmitted. The two orthogonal polarizations simultaneously transmitted by the base station 500 may be expressed as a 2×2 matrix "P=[p⁻ p⊥]". Here, p⁻ is a vector having a 2×1 size that indicates one TPS, and has the same meaning as that of p in Equation (2). Moreover, $p^{\perp}$ is a vector having a 2×1 size that indicates one TPS orthogonal to p⁻.

$$p^{\perp} = \begin{bmatrix} p_\alpha^{\perp} \\ p_\beta^{\perp} \end{bmatrix} = \begin{bmatrix} \cos\theta^{\perp} \\ \sin\theta^{\perp} \end{bmatrix} = \begin{bmatrix} \cos\left(\theta + \frac{\pi}{2}\right) \\ \sin\left(\theta + \frac{\pi}{2}\right) \end{bmatrix} = \begin{bmatrix} -\sin\theta \\ \cos\theta \end{bmatrix} \quad (9)$$

where $\theta^{\perp}=\theta+\pi/2$. Therefore, the base station 500 and the terminals determine M of $\{\theta_m\}_{m=1,\ldots,M}$ as expressed in Equation (3). The base station 500 and the terminals preappoint a set "Q" of M polarization state matrixes $\{P_m\}_{m=1,\ldots,M}$.

The set "Q" of polarization state matrixes may be expressed as Equation (10).

$$Q = \{P_1, P_2, \ldots P_M\} \quad (10)$$
$$= \{[\, p_1^- \; p_1^+\,], [\, p_2^- \; p_2^+\,], \ldots [\, p_M^- \; p_M^+\,]\}$$

A polarization state matrix set "Q", which is configured with M of $\{\theta_m\}_{m=1,\ldots,M}$ and $\{\theta_m^{\perp}\}_{m=1,\ldots,M}$ that is orthogonal thereto and indicates a polarization direction, may be expressed as in Equation (11).

$$Q = \{[\,\theta_1^- \quad \theta_1^+\,], [\,\theta_2^- \quad \theta_2^+\,], \ldots [\,\theta_M^- \quad \theta_M^+\,]\} \quad (11)$$

$$= \{[\,\theta_1^- \quad \theta_1^- + \frac{\pi}{2}\,], [\,\theta_2^- \quad \theta_2^- + \frac{\pi}{2}\,], \ldots [\,\theta_M^- \quad \theta_M^- + \frac{\pi}{2}\,]\}$$

Referring again to FIG. 4, the TPS selector 450 of each terminal selects a TPS vector, which is optimally matched with the downlink channel of each terminal, from among 2M TPS vectors included in the set "Q" as expressed in Equation (12). Equation (12) expresses an example in which each terminal selects a TPS enabling downlink transmission power or a data transmission rate to be the maximum.

$$\{m_k, \chi_k\} = \arg\max_{\chi \in \{-,+\}, m \in \{1,2,\ldots,M\}} \|H_k p_m^\chi\|^2 \quad (12)$$

where $m_k$ denotes an index of a matrix (preferred matrix index (PMI)) that includes a TPS selected by a $k^{th}$ terminal, $\chi_k$ denotes a polarization index of a vector (preferred polarization index (PPI)) selected by the $k^{th}$ terminal, and each terminal feeds back the PMI and the PPI to the base station 500.

Moreover, each terminal calculates a receivable SINR using the selected optimal TPS vector, and transmits the SINR as CQI to the base station 500 over a feedback channel.

The base station 500 may include a scheduler 510, a coding and modulation unit 530, a TPS controller 550, and an orthogonal polarization antenna 570.

The scheduler 510 selects the two terminals 400-1 and 400-2 "$k^*_1$," and "$k^*_2$," which satisfy a predetermined scheduling reference and in which the transmission rate sum of data streams to simultaneously transmit is the maximum, using CQI and the PMI and PPI information of the optimal TPS vector that are fed back from each terminal. Also, the scheduler 510 determines an MCS for a data stream that will be transmitted to the selected two terminals 400-1 and 400-2. Here, the two scheduled terminals 400-1 and 400-2 use TPS vectors that are orthogonal to each other. That is, the terminals 400-1 and 400-2 that simultaneously transmit data use two vectors configuring one $P_m$.

The coding and modulation unit 530 performs coding and modulation to generate a symbol according to the MCS determined by the scheduler 510, and supplies a transmission layer, which is configured with a plurality of generated symbols, to the TPS controller 550.

The TPS controller 550 controls the amplitude and phase of a signal supplied to two orthogonal linear polarization antenna elements 571 and 573 such that the transmission layer supplied from the coding and modulation unit 530 is transmitted as the optimal TPS of a corresponding terminal. Such a transmission polarization control operation may be performed through baseband signal processing, and an operation of multiplying a 2×1 vector "$x=[x_{k^*_1} \; x_{k^*_2}]^T$" configured with symbols of two transmission layers by an optimal TPS matrix "$P=[p_{m_{k*1}}^- \; p_{m_{k*2}}^+]$" may be expressed as in Equation (13).

$$s = Px = \begin{bmatrix} p_{m_{k_1^*}}^- & p_{m_{k_2^*}}^+ \end{bmatrix} \begin{bmatrix} x_{k_1^*} \\ x_{k_2^*} \end{bmatrix} = p_{m_{k_1^*}}^- x_{k_1^*} + p_{m_{k_2^*}}^+ x_{k_2^*} \quad (13)$$

In the orthogonal polarization antenna 570 of the base station 500, a first element of a vector "s" is transmitted through an α-direction polarization antenna element, and a second element of the vector "s" is transmitted through a β-direction polarization antenna element.

The orthogonal polarization antenna 570 is configured with the two orthogonal linear polarization antenna elements 571 and 573 that separately receive an input signal to generate two orthogonal linear polarizations according to the irradiation structure of an antenna.

Figure 5:
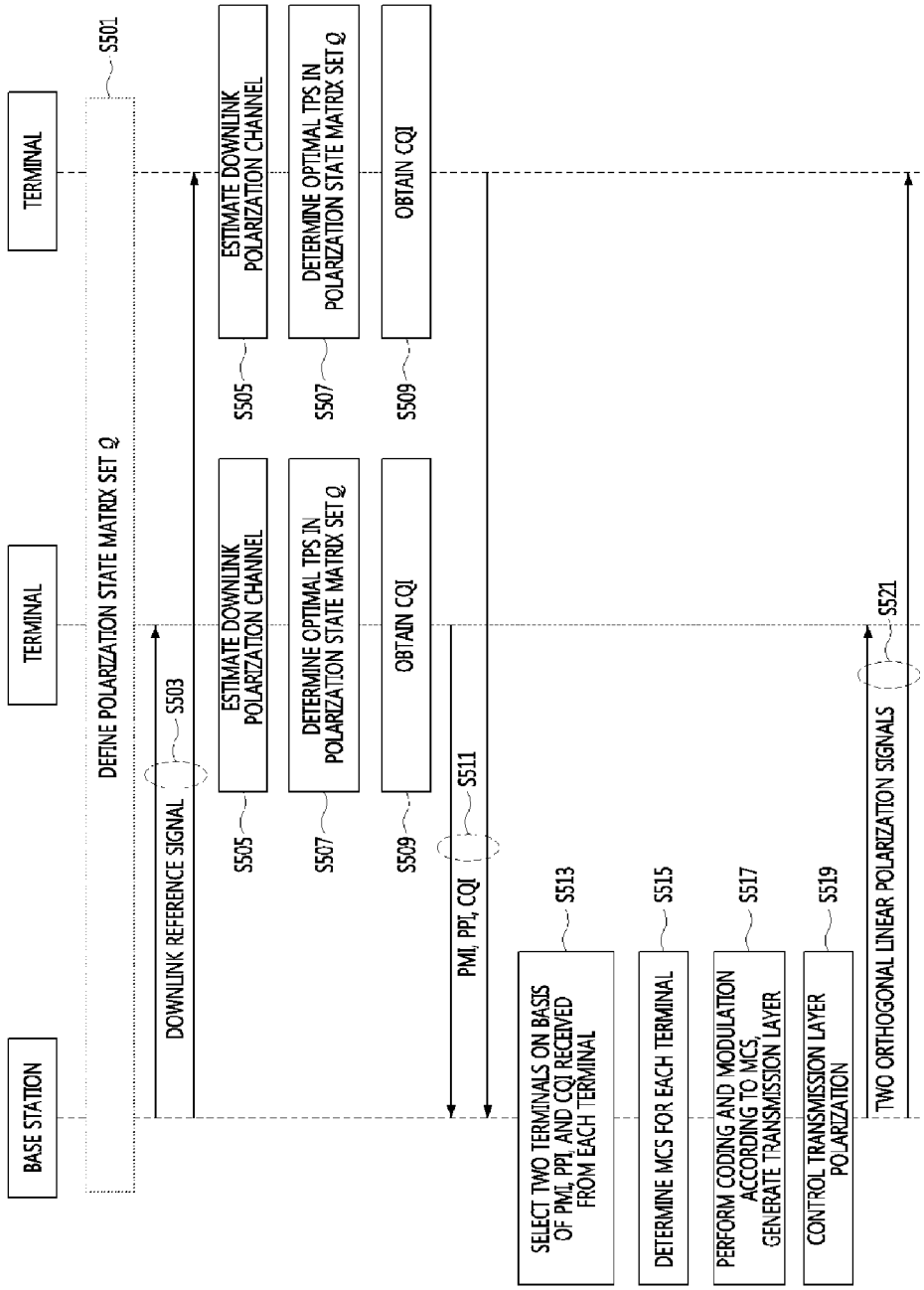
FIG. 5 is a flowchart illustrating a wireless communication method using adaptive transmission polarization control according to another embodiment of the present invention.

FIG. 5 is a flowchart illustrating a wireless communication method using adaptive transmission polarization control according to another embodiment of the present invention.

Referring to FIG. 5, first, the base station 500 and all the terminals in the cell preappoint the polarization state matrix set "Q" including a plurality of polarization state matrixes expressed in Equation 10 in operation S501.

In operation S503, the base station 500 respectively transmits different reference signals "RS" to all the terminals in the cell through the two orthogonal linear polarization antenna elements to estimate the downlink polarization channel of each terminal.

In operation S505, each terminal 100 estimates a downlink polarization channel matrix on the basis of the received reference signal "RS".

Each terminal determines (PMI or PPI) an optimal TPS vector, which is optimally matched with the downlink channel in the matrix set "Q" on the basis of the estimated downlink polarization channel matrix in operation S507.

Moreover, each terminal obtains CQI with the selected optimal TPS vector on the basis of a receivable SINR, in operation S509.

Subsequently, each terminal feeds back PMI information, PPI information, and CQI to the base station 500, in operation S511.

In operation S513, the scheduler 510 selects two terminals which satisfy a predetermined scheduling reference and in which the transmission rate sum of data streams to simultaneously transmit is the maximum, using the CQI, and PMI and PPI information that are fed back from each terminal.

Moreover, the base station 500 determines an MCS for a data stream that will be transmitted to the two selected terminals in operation S515.

Subsequently, the base station 500 performs coding and modulation to generate a symbol according to the determined MCS of each terminal, and supplies a transmission layer which is configured with the generated symbol in operation S517.

In operation S519, the base station 500 controls (precodes) the amplitude and phase of a signal supplied to an orthogonal linear polarization antenna element such that the transmission layer is transmitted as the optimal TPS of a corresponding terminal, thereby generating two orthogonal linear polarization signals having a polarization direction optimized for each terminal.

Subsequently, the base station 500 transmits the two orthogonal linear polarization signals to the two terminals through the orthogonal polarization antenna in operation S521.

Hereinafter, an SPDMA method in which the PDMA method and the SDMA method are optimally combined will be described as a wireless communication method using adaptive transmission polarization control according to another embodiment of the present invention with reference to FIGS. 6 to 8.

In the SPDMA method that is the wireless communication method using adaptive transmission polarization control according to another embodiment of the present invention, a base station establishes a maximum of two polarization channels for each space channel that is established by SDMA equal to the number of orthogonal polarization antennas, and simultaneously transmits data to a number of terminals, a maximum of which is twice the number of orthogonal polarization antennas. In the present invention, by optimally combining the existing SDMA technology with the above-described PDMA technology, a downlink transmission capacity that is a maximum of twice that of the SDMA technology can be provided.

FIG. 6 is an exemplary diagram illustrating a configuration of an array antenna of a base station which performs SPDMA according to another embodiment of the present invention.

As illustrated in a portion (a) of FIG. 6, a base station may use a transmission array antenna that is configured with $n_T$ orthogonal polarization antennas, and a $b^{th}$ orthogonal polarization antenna of the transmission array antenna may transmit $\alpha_b$-direction polarization and $\beta_b$-direction polarization that are orthogonal to each other. That is, in the present invention, a case in which the transmission array antenna has different transmission polarization directions according to orthogonal polarization antennas is assumed.

Moreover, as illustrated in a portion (b) of FIG. 6, each of a plurality of terminals may use a reception array antenna that is configured with $n_R$ orthogonal polarization antennas, and an $a^{th}$ orthogonal polarization antenna of the reception array antenna may receive $\gamma_{k,a}$-direction polarization and $\omega_{k,a}$-direction polarization that are orthogonal to each other for receiving a signal. That is, in the present invention, a case in which the reception array antenna has different reception polarization directions according to orthogonal polarization antennas is assumed.

$2n_T$ linear polarization signals, which are transmitted through the orthogonal array antenna of the base station, undergo multi-path fading of a wireless channel and then are respectively received by $n_R$ orthogonal polarization antennas of each terminal. A wireless channel between the base station and a $k^{th}$ terminal may be expressed as in Equation (14).

$$H_k = \begin{bmatrix} H_{k(1,1)} & H_{k(1,2)} & \cdots & H_{k(1,n_T)} \\ H_{k(2,1)} & H_{k(2,2)} & \cdots & H_{k(2,n_T)} \\ \vdots & \vdots & \ddots & \vdots \\ H_{k(n_R,1)} & H_{k(n_R,2)} & \cdots & H_{k(n_R,n_T)} \end{bmatrix}, \quad (14)$$

$$\text{where } H_{k(a,b)} = \begin{bmatrix} h_{k(a,b)}^{\gamma_{k,a}\alpha_b} & h_{k(a,b)}^{\gamma_{k,a}\beta_b} \\ h_{k(a,b)}^{\omega_{k,a}\alpha_b} & h_{k(a,b)}^{\omega_{k,a}\beta_b} \end{bmatrix}$$

where $H_{k(a,b)}$ indicates a polarization channel matrix in which $\alpha_b$-direction polarization and $\beta_b$-direction polarization received by the $b^{th}$ orthogonal polarization antenna of the orthogonal polarization array antenna in the base station are respectively received through $\gamma_{k,a}$-direction polarization and $\omega_{k,a}$-direction polarization of the $a^{th}$ orthogonal polarization antenna of the $k^{th}$ terminal.

In SPDMA according to the present invention, the base station simultaneously transmits $2n_T$ linear polarizations (i.e., $n_T$ groups of two orthogonal linear polarizations), and each of a plurality of terminals performs reception though $2n_R$ linear polarizations (i.e., $n_R$ groups of two orthogonal linear polarizations). In a two-dimensional (2D) domain in space and polarization, multiple access technology simultaneously transmits downlink data to a maximum of $2n_T$ terminals.

The base station uses a $2n_T \times 2n_T$ precoding matrix "F" for precoding $2n_T$ transmission layers. In the present invention, the precoding matrix "F" is configured in a hierarchical type as expressed in Equation (15).

$$F = \begin{bmatrix} c_{1,1}P_1 & c_{1,2}P_1 & \cdots & c_{1,n_T}P_1 \\ c_{2,1}P_2 & c_{2,2}P_2 & \cdots & c_{2,n_T}P_2 \\ \vdots & \vdots & \ddots & \vdots \\ c_{n_T,1}P_{n_T} & c_{n_T,2}P_{n_T} & \cdots & c_{n_T,n_T}P_{n_T} \end{bmatrix} \quad (15)$$

$$= \begin{bmatrix} c_{1,1}p_1^- c_{1,1}p_1^\perp & c_{1,2}p_{1,2}^- c_{1,2}p_1^\perp & \cdots & c_{1,n_T}p_1^- c_{1,n_T}p_1^\perp \\ c_{2,1}p_2^- c_{2,1}p_2^\perp & c_{2,2}p_2^- c_{2,2}p_2^\perp & \cdots & c_{2,n_T}p_2^- c_{2,n_T}p_2^\perp \\ \vdots & \vdots & \ddots & \vdots \\ c_{n_T,1}p_{n_T,1}^- c_{n_T,1}p_{n_T}^\perp & c_{n_T,2}p_{n_T,2}^- c_{n_T,2}p_{n_T}^\perp & \cdots & c_{n_T,n_T}p_{n_T}^- c_{n_T,n_T}p_{n_T}^\perp \end{bmatrix}$$

$$= [\,f_1^- f_1^\perp \quad f_2^- f_2^\perp \quad \cdots \quad f_{n_T}^- f_{n_T}^\perp\,]$$

where each of two precoding vectors "$f_l^-$" and "$f_l^\perp$" has a size of $2n_T \times 1$, and is a vector for precoding one layer. The precoding vector "$f_l^-$" is configured by multiplying a polarization matching vector "$\{p_b^-\}_{b=1,\ldots,n_T}$" (which is used for matching orthogonal polarizations transmitted from $n_T$ orthogonal polarization antennas) by elements "$\{c_{b,m}\}_{b=1,\ldots,n_T}$" of a space weight vector "$c_m$" that is used for compensating for a channel difference between spatially separated orthogonal polarization antennas. The precoding vector "$f_l^\perp$" is configured by multiplying a polarization matching vector "$\{p_b^\perp\}_{b=1,\ldots,n_T}$" (which is used for matching orthogonal polarizations transmitted from $n_T$ orthogonal polarization antennas) by the elements "$\{c_{b,m}\}_{b=1,\ldots,n_T}$" of the space weight vector "$c_m$". Here, the vector "$c_m = [c_{1,m}\ c_{2,m}\ \cdots\ c_{n_T,m}]$" that has a size of $n_T \times 1$ and is configured with $n_T$ elements is defined as the space weight vector for compensating for the channel difference between the spatially separated orthogonal polarization antennas. $n_T$ space weight vectors "$\{c_m\}_{m=1,\ldots,n_T}$" are used for SDMA that configures a maximum of $n_T$ space channels.

Therefore, in SPDMA according to another embodiment of the present invention, $2n_T$ precoding vectors having a size of $2n_T \times 1$ for precoding $2n_T$ layers are systematically configured as expressed in Equation (15) by combining $2n_T$ polarization matching vectors "$(\{p_b^-\}_{b=1,\ldots,n_T}, \{p_b^\perp\}_{b=1,\ldots,n_T})$" and the $n_T$ space weight vectors "$\{c_m\}_{m=1,\ldots,n_T}$".

The space weight vector "$c_m$" may be selected from a preappointed weight vector codebook for SDMA so as to be optimized for a downlink space channel to a corresponding channel in $n_T$ orthogonal polarization antennas of the base station.

Each terminal may use a codebook and MIMO technology that are proposed in the existing $3^{rd}$ Generation Partnership Project (3GPP) Long Term Evolution (LTE) system. When a terminal uses a discrete Fourier transform (DFT) codebook of the LTE system, a codebook "$\mathcal{C} = \{C_1, C_2, \ldots C_n\}$" that is configured with N precoding matrixes having a size of $n_T \times n_T$ may be assumed.

Here, $C_n$ may be configured with $n_T$ orthogonal vectors, and designed to adequately copy $[C_1\ c_2\ \cdots\ c_{n_T}]$ of Equation (15). Also, the polarization matching vectors "$(\{p_b^-\}_{b=1,\ldots,n_T}$" and "$(\{p_b^\perp\}_{b=1,\ldots,n_T}$" of the transmission polarization antenna element may be b=1 selected from the polarization state matrix set "Q".

Therefore, in SPDMA according to another embodiment of the present invention, by combining the polarization state matrix set "Q" and the precoder codebook "$\mathcal{C}$" for SDMA as expressed in Equation (15), a new space and polarization weight vector codebook "$\mathcal{R}$" may be preappointed between base stations and a plurality of terminals.

Figure 7:
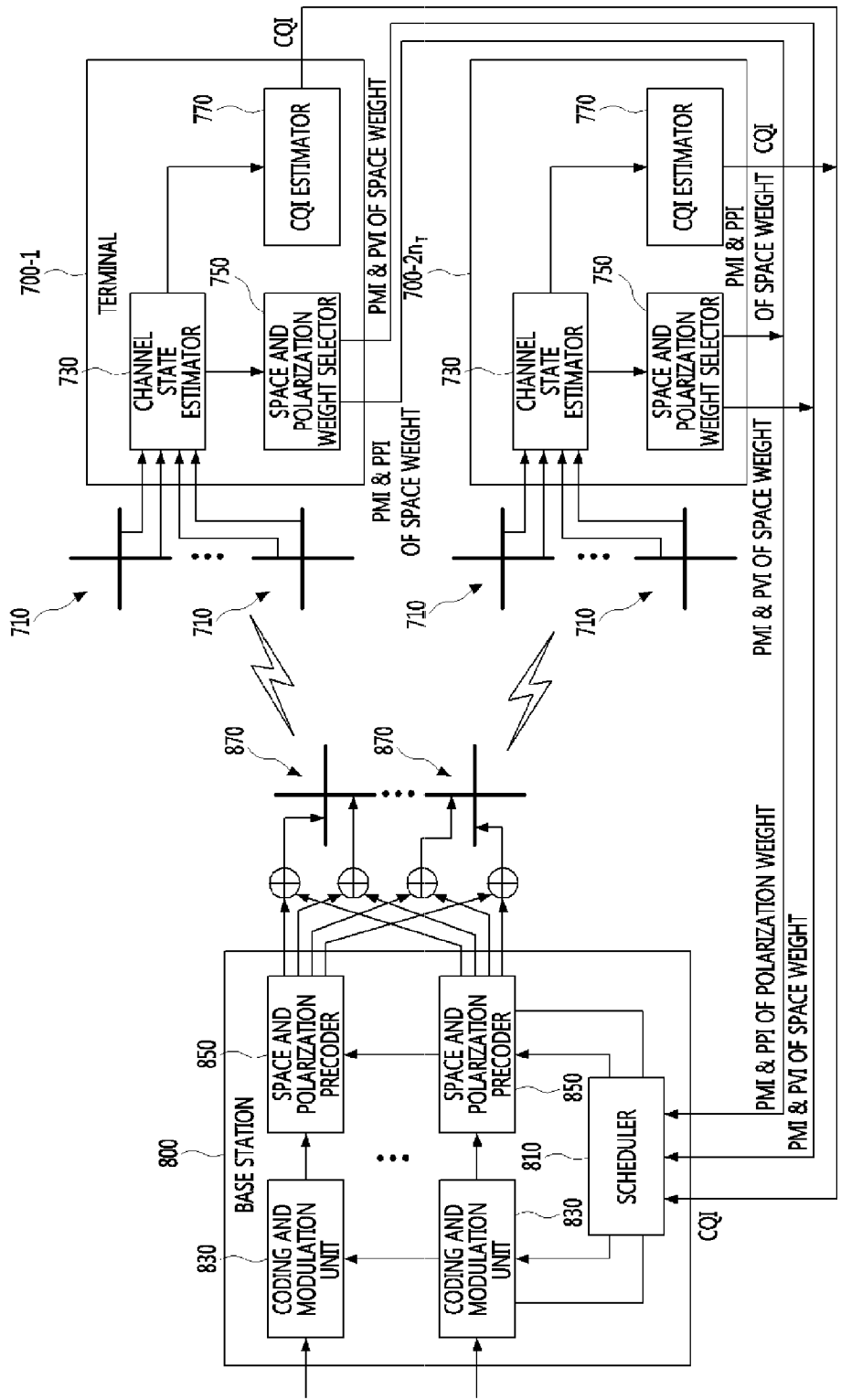
FIG. 7 is a block diagram illustrating a configuration of a wireless communication apparatus according to another embodiment of the present invention.

FIG. 7 is a block diagram illustrating a configuration of a wireless communication apparatus which performs SPDMA according to another embodiment of the present invention.

Referring to FIG. 7, a base station 800 transmits $2n_T$ linear polarization signals through $n_T$ orthogonal polarization antennas. Each of a plurality of terminals receives the $2n_T$ linear polarization signals transmitted from the base station through $n_R$ orthogonal polarization antennas. Here, the $2n_T$ linear polarization signals transmitted from the base station 800 undergo multi-path fading of a wireless channel and then are received by each terminal.

Each terminal may include $n_R$ orthogonal polarization antennas 710, a channel state estimator 730, a space and polarization weight selector 750, and a CQI estimator 770.

Each of $n_R$ orthogonal polarization antennas 710 included in each terminal may be configured with two orthogonal linear polarization antenna elements. Each orthogonal polarization antenna 710 receives $2n_T$ reference signals "RS" transmitted from the base station 800 and supplies the received reference signals to the channel state estimator 730.

The channel state estimator 730 of each terminal estimates a downlink space and polarization channel matrix expressed in Equation (14) on the basis of the reference signal "RS" supplied to the orthogonal polarization antenna 710.

The space and polarization weight selector 750 of each terminal selects a space and polarization weight vector "$f_k$" having a size of $2n_T \times 1$, which is optimally suitable for a predetermined selection reference, from a preappointed space and polarization weight vector codebook "$\mathcal{R}$" using the estimated wireless channel matrix.

Here, the space and polarization weight selector 750 of each terminal feeds back the PMI "$\{m_{k,b}\}_{b=1,\ldots,n_T}$" and PPI "$\{\chi_{k,b}\}_{b=1,\ldots,n_T}$" of a polarization state matrix set "Q", indicating $2n_T$ polarization matching vectors having a size of $2\times1$ in the selected weight vector "$f_k$", to the base station 800 through an uplink.

Moreover, the space and polarization weight selector 750 of each terminal feeds back the PMI "$d_k$" of a precoder codebook "$\mathcal{C}$" for SDMA indicating one $n_T \times 1$ space weight vector in the selected weight vector "$f_k$" and a preferred vector index (PVI) "$v_k$" to the base station 800 through the uplink.

In SPDMA according to another embodiment of the present invention, a preferred optimal space and polarization weight vector is divided into a polarization weight vector and a space weight vector and systematically fed back to the base station 800. According to the above-described method, the present invention can reduce the number of operations that are performed by a terminal for selecting an optimal polarization matching vector and a space weight vector, and minimize the amount of information necessary for feedback.

The CQI estimator 770 of each terminal calculates a receivable SINR using a preferred space and polarization weight vector, and transmits the calculated SINR as CQI to the base station 800 through an uplink feedback channel.

The base station 800 may include a scheduler 810, a plurality of coding and modulation units 830, a plurality of space and polarization precoders 850, and a plurality of orthogonal polarization antennas 870.

The scheduler 810 selects a maximum of $2n_T$ terminals 700-1 to 700-$2n_T$, such that the transmission rate sum of simultaneously transmitted data streams satisfying a predetermined scheduling reference is the maximum, using the PMI and PPI information of a polarization matching vector, the PMI and PVI information of a space weight vector, and CQI that are fed back from each terminal.

Moreover, the scheduler 810 determines an MCS for a data stream transmitted to each of the selected terminals.

Each of the coding and modulation units 830 performs coding and modulation to generate a symbol on the basis of the MCS information (which is supplied from the scheduler 810) for the selected terminals 700-1 to 700-$2n_T$, and supplies a transmission layer that is configured with the generated symbol.

Each of the space and polarization precoders 850 controls the amplitude and phase of a signal supplied to $2n_T$ orthogonal linear polarization antenna elements such that the transmission layer supplied from a corresponding coding and modulation unit 830 is transmitted as the optimal space and polarization weight of a corresponding terminal.

Each of the orthogonal polarization antennas 870 is configured with two orthogonal linear polarization antennas. Each of the linear polarization antennas separately receives an input signal from the space and polarization precoder 850, and generates and irradiates two orthogonal linear polarizations according to the irradiation structure of an antenna, thereby transmitting $2n_T$ transmission layers through $n_T$ orthogonal polarization antennas.

Figure 8:
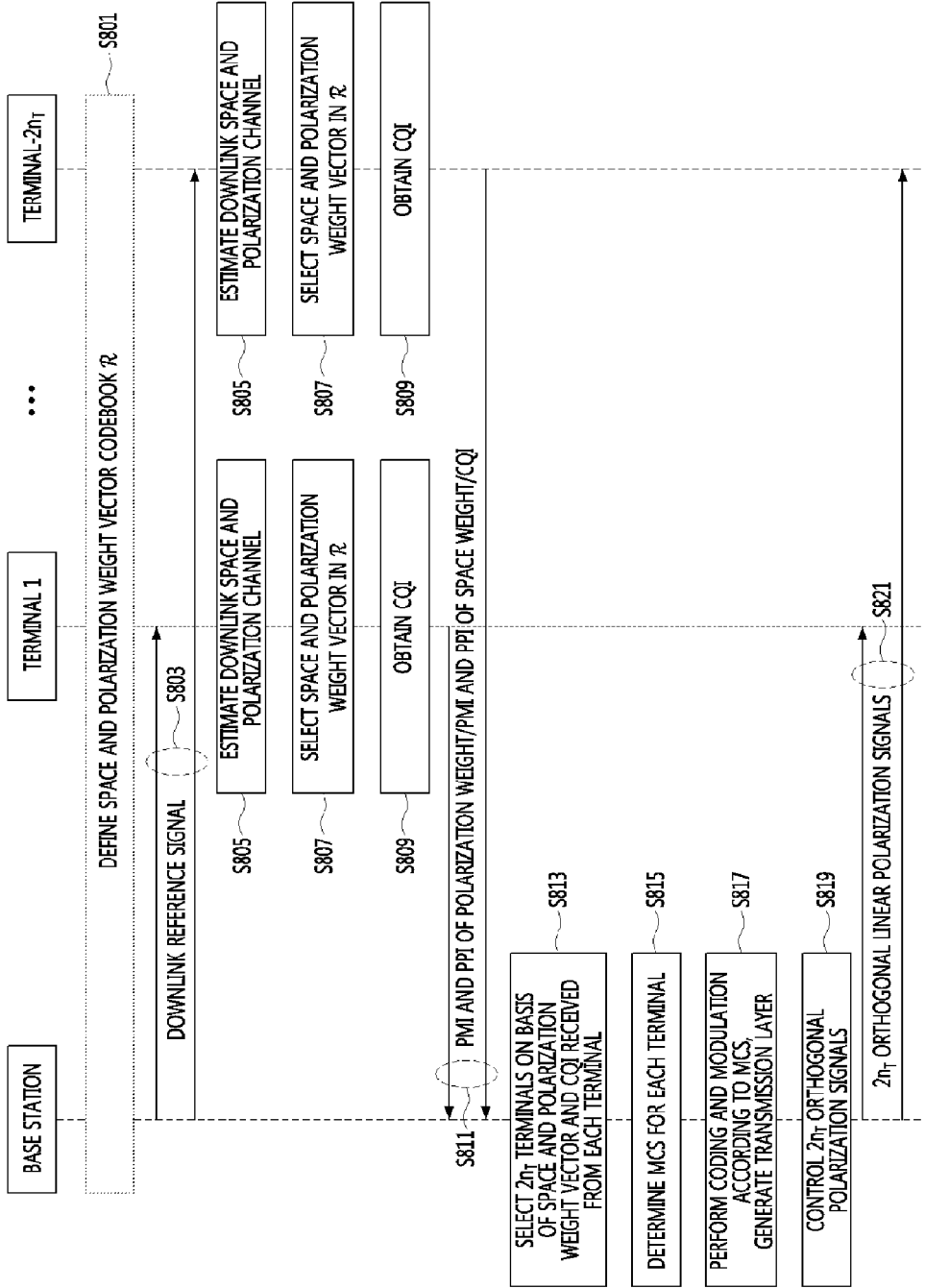
FIG. 8 is a flowchart illustrating an SPDMA method using adaptive transmission polarization control according to another embodiment of the present invention.

FIG. 8 is a flowchart illustrating an SPDMA method using adaptive transmission polarization control according to another embodiment of the present invention.

Referring to FIG. 8, first, by combining the polarization state matrix set "Q" and the precoder codebook "$\mathcal{C}$" for SDMA as expressed in Equation (15), the base station 800 and the plurality of terminals define a new space and polarization weight vector codebook "$\mathcal{R}$" in operation S801.

In operation S803, the base station 800 transmits $2n_T$ different reference signals "RS" to all the terminals in a cell (which is operated and managed by the base station 800) through $2n_T$ different linear polarization antennas to estimate the downlink polarization channel of each of the terminals.

Each terminal estimates a downlink space and polarization channel matrix on the basis of the reference signal "RS" received from the base station 800, in operation S805.

In operation S807, each terminal selects a space and polarization weight vector, which is optimally matched with the downlink channel, from a pre-defined space and polarization weight vector codebook "$\mathcal{R}$" on the basis of the estimated downlink space and polarization channel matrix. Here, each terminal selects the PMI and PPI of a polarization weight vector and the PMI and PVI of a space weight vector.

Moreover, each terminal obtains CQI with the selected space and polarization weight vector on the basis of a receivable SINR, in operation S809.

Subsequently, each terminal feeds back the PMI and PPI of the polarization weight vector, the PMI and PVI of the space weight vector, and the CQI to the base station 800 in operation S811.

In operation S813, the base station 800 selects $2n_T$ terminals such that the transmission rate sum of simultaneously transmitted data streams satisfying a predetermined scheduling reference is the maximum on the basis of the feedback space and polarization weight vector and CQI.

Moreover, the base station 800 determines an MCS for a data stream transmitted to each of the selected $2n_T$ terminals in operation S815.

In operation S817, the base station 800 performs coding and modulation to generate a symbol according to the determined MCS for each terminal, and supplies a transmission layer that is configured with the generated symbol.

In operation S819, the base station 800 controls the amplitude and phase of a signal supplied to $2n_T$ orthogonal linear polarization antenna elements such that the transmission layer is transmitted as the optimal TPS of a corresponding terminal, thereby generating $2n_T$ orthogonal linear polarization signals having a polarization direction optimized for each terminal.

Subsequently, the base station 800 transmits the $2n_T$ orthogonal linear polarization signals to $2n_T$ terminals through $n_T$ orthogonal polarization antennas in operation S821.

According to the wireless communication method and apparatus using adaptive transmission polarization control, a transmission apparatus and all reception apparatuses preappoint the TPS set that is configured with a plurality of transmittable TPSs, and a terminal selects an optimal TPS from the TPS set and feeds back an index corresponding to the selected TPS to a base station.

Moreover, the wireless communication method determines two mobile stations that will receive two orthogonal TPSs and data in which the transmission rate sum of two data streams transmitted simultaneously through the two orthogonal polarizations is the maximum, and simultaneously transmits data to the two determined mobile stations using two orthogonal transmission polarizations.

Moreover, the wireless communication system, using the transmission and reception array antenna that is configured with a plurality of orthogonal polarization antenna elements transmitting and receiving two orthogonal polarizations, determines a plurality of terminals for simultaneously receiving an optimal TPS, the weight of a space array antenna, and data to perform SPDMA such that the transmission rate sum of data streams simultaneously transmitted over a transmission channel which is two-dimensionally established in space and polarization domains is the maximum.

Accordingly, by adaptively controlling polarization of a signal transmitted by a transmission apparatus with limited uplink feedback information, the wireless communication method can minimize the degradation of performance due to PS occurring in a wireless channel and polarization mismatching between transmission and reception polarizations, and maximize a downlink transmission capacity.

Moreover, the wireless communication method and apparatus using transmission polarization control according to the present invention enable the operation and use of various future mobile communication network structures and optimal wireless radio wave resources that adapt to various wireless environments according to the mobile communication network structures, and are broadly used in the base stations and/or repeater systems of a new next-generation mobile communication system that combines and applies PDMA technology and SDMA technology for high-speed data transmission.

While the example embodiments of the present invention and their advantages have been described in detail, it should be understood that various changes, substitutions and alterations may be made herein without departing from the scope of the invention.

What is claimed is:

1. A wireless communication apparatus comprising:
    an orthogonal polarization antenna configured to receive at least one reference signal;
    a channel state estimator configured to estimate a wireless polarization channel on the basis of the reference signal; and
    a transmission polarization state (TPS) selector configured to select a TPS corresponding to the estimated wireless polarization channel from among a plurality of M predefined TPSs, and feed back an index into the plurality of predefined TPSs on the selected TPS, wherein a TPS comprises complex-number weights for determining sizes and phases of at least two orthogonal polarization signals, and further wherein the TPS selector selects a TPS enabling downlink transmission power or a data transmission rate to be a maximum as denoted by $$\{m_k, \chi_b\} = \arg\max_{\chi \in \{-,\perp\}, m \in \{1,2,\ldots,M\}} \|H_k p_m^\chi\|^2$$

where $m_k$ denotes a preferred matrix index that includes a TPS selected by a $k^{th}$ wireless communication apparatus, $X_k$ denotes a preferred polarization index selected by the $k^{th}$ wireless communication apparatus, and where an optimal TPS "$p_m^k$" is equivalent to a vector closest to a largest singular vector "$v_k$" of a polarization channel matrix "$H_k$" being selected from the plurality of predefined TPSs.

2. The wireless communication apparatus of claim 1, wherein the TPS selector selects a TPS in which a data transmission rate is the maximum from among the plurality of TPSs, and feeds back an indicator having the selected TPS.

3. The wireless communication apparatus of claim 1, further comprising a channel state information estimator configured to calculate a receivable data transmission rate or SINR using the selected TPS, and feed back the calculated SINR or data transmission rate as channel state information.

4. The wireless communication apparatus of claim 1, wherein,
    each of the predefined TPSs corresponds with a plurality of polarization state matrixes, and
    the TPS selector selects one polarization state matrix from among the polarization state matrixes, and selects one of two orthogonal polarization vectors which configure the selected one polarization state matrix.

5. The wireless communication apparatus of claim 4, wherein the TPS selector feeds back an index indicating the selected polarization state matrix and an index indicating the selected polarization vector.

6. A communication system including a wireless communication apparatus comprising:
    at least one orthogonal polarization antenna configured to receive at least one reference signal;
    a channel state estimator configured to estimate a space and polarization channel on the basis of the reference signal; and
    a space and polarization weight selector configured to select a space and polarization weight corresponding to the estimated space and polarization channel from a predefined space and polarization weight vector codebook, and feed back the selected space and polarization weight information, wherein the selected space and polarization weight information includes a preferred matrix index indicating a transmission polarization state (TPS) selected by the wireless communication apparatus and a preferred polarization index, wherein the TPS includes complex-number weights for determining sizes and phases of at least two orthogonal polarization signals, and further wherein the wireless communication apparatus selects a TPS enabling downlink transmission power or a data transmission rate to be a maximum as denoted by $$\{m_k, \chi_b\} = \arg\max_{\chi \in \{-,\perp\}, m \in \{1,2,\ldots,M\}} \|H_k p_m^\chi\|^2$$

where $m_k$ denotes a preferred matrix index that includes a TPS selected by a $k^{th}$ wireless communication apparatus, $X_k$ denotes a preferred polarization index selected by the $k^{th}$ wireless communication apparatus, and where an optimal TPS "$p_m^k$" is equivalent to a vector closest to a largest singular vector "$v_k$" of a polarization channel matrix "$H_k$" being selected from a plurality of M predefined TPSs.

7. The wireless communication system of claim 6, wherein the predefined space and polarization weight vector codebook is formed by combining a polarization state matrix set and a precoder codebook for SDMA.

8. The wireless communication system of claim 6, wherein the space and polarization weight selector feeds back an index corresponding to the polarization weight selected from the space and polarization weight vector codebook and an index corresponding to the selected space weight.

9. A wireless communication apparatus comprising:
a scheduler configured to select at least one reception apparatus on the basis of at least one of channel quality information and a transmission polarization state (TPS) index received from at least one reception apparatus, and determine a modulation and coding scheme for a signal to be transmitted to the selected at least one reception apparatus;
a coding and modulation unit configured to perform coding and modulation to generate a transmission layer to be transmitted to the at least one reception apparatus on the basis of the determined coding and modulation scheme for the selected at least one reception apparatus;
a TPS controller configured to control polarization of the transmission layer to be transmitted to the selected at least one reception apparatus on the basis of an index into a plurality of M predefined TPSs received from the selected at least one reception apparatus, wherein a TPS comprises complex-number weights for determining sizes and phases of at least two polarization orthogonal signals,
further wherein each at least one reception apparatus selects a TPS enabling downlink transmission power or a data transmission rate to be a maximum as denoted by $$\{m_k, \chi_b\} = \arg\max_{\chi \in \{-,\perp\}, m \in \{1,2,\ldots,M\}} \|H_k p_m^\chi\|^2$$

where $m_k$ denotes a preferred matrix index that includes a TPS selected by a $k^{th}$ reception apparatus, $X_k$ denotes a preferred polarization index selected by the $k^{th}$ reception apparatus, and where an optimal TPS "$p_m^k$" is equivalent to a vector closest to a largest singular vector "$v_k$" of a polarization channel matrix "$H_k$" being selected from the plurality of M predefined TPSs, and
at least one orthogonal polarization antenna configured to irradiate the at least one polarization-controlled transmission layer through two orthogonal linear polarization antenna elements, the at least one orthogonal polarization antenna comprising the two orthogonal linear polarization antenna elements.

10. The wireless communication apparatus of claim 9, wherein the scheduler selects two terminals in which a transmission rate sum of data for simultaneously transmitting is the maximum on the basis of channel quality information and TPS information received from a plurality of reception apparatuses, and transmits data, which will be respectively transmitted to the selected two terminals simultaneously, to two orthogonal linear polarization antenna elements which configure one orthogonal polarization antenna.

11. The wireless communication apparatus of claim 9, wherein the scheduler selects a plurality of terminals in which a transmission rate sum of data for simultaneously transmitting is the maximum on the basis of channel quality information and TPS information received from a plurality of reception apparatuses, the number of selected terminals being twice the number of orthogonal polarization antennas.

12. A wireless communication method comprising:
estimating a wireless polarization channel on the basis of a received reference signal;
selecting a transmission polarization state (TPS) from among a plurality of M predefined TPSs on the basis of the estimated wireless polarization channel; and
transmitting an index into the plurality of predefined TPSs indicating the selected TPS, wherein a TPS comprises complex-number weights for determining sizes and phases of at least two orthogonal polarization signals, and
further wherein the selecting selects a TPS enabling downlink transmission power or a data transmission rate to be a maximum as denoted by $$\{m_k, \chi_b\} = \arg\max_{\chi \in \{-,\perp\}, m \in \{1,2,\ldots,M\}} \|H_k p_m^\chi\|^2$$

where $m_k$ denotes a preferred matrix index that includes a TPS selected by a $k^{th}$ terminal, $X_k$ denotes a preferred polarization index selected by the $k^{th}$ terminal, and where an optimal TPS "$p_m^k$" is equivalent to a vector closest to a largest singular vector "$v_k$" of a polarization channel matrix "$H_k$" being selected from the plurality of M predefined TPSs.

13. The wireless communication method of claim 12, wherein,
each of the predefined TPSs corresponds with a plurality of polarization state matrixes, and
the indication information indicating the TPS comprises index information indicating a selected polarization state matrix among the plurality of polarization state matrixes, and index information indicating a selected polarization vector.

14. A wireless communication method comprising:
estimating a space and polarization channel on the basis of at least one received reference signal;
selecting a space and polarization weight corresponding to the estimated space and polarization channel from a predefined space and polarization weight vector codebook; and
transmitting the selected space and polarization weight information, wherein the selected space and polarization weight information includes a preferred matrix index indicating a transmission polarization state (TPS) and a preferred polarization index, and
further wherein the indicated TPS enables downlink transmission power or a data transmission rate to be a maximum as denoted by $$\{m_k, \chi_b\} = \arg\max_{\chi\in\{-,\perp\},m\in\{1,2,\ldots,M\}} \|H_k p_m^\chi\|^2$$

where $m_k$ denotes a preferred matrix index that includes a TPS selected by a $k^{th}$ terminal, $X_k$ denotes a preferred polarization index selected by the $k^{th}$ terminal, and where an optimal TPS "$p_m^k$" is equivalent to a vector closest to a largest singular vector "$v_k$" of a polarization channel matrix "$H_k$" being selected from a plurality of M predefined TPSs.

15. A wireless communication method comprising:
selecting at least one reception apparatus on the basis of at least one of channel quality information and a transmission polarization state (TPS) index received from at least one reception apparatus;
determining a modulation and coding scheme for a signal to be transmitted to the selected at least one reception apparatus;
performing coding and modulation to generate a transmission layer to be transmitted to the at least one reception apparatus on the basis of the determined coding and modulation scheme for the selected at least one reception apparatus;
controlling polarization of the transmission layer to be transmitted to the selected at least one reception apparatus on the basis of the TPS index received from the selected at least one reception apparatus, wherein a TPS comprises complex-number weights for determining sizes and phases of at least two polarization signals; and
further wherein each reception apparatus selects a TPS enabling downlink transmission power or a data transmission rate to be a maximum as denoted by $$\{m_k, \chi_b\} = \arg\max_{\chi\in\{-,\perp\},m\in\{1,2,\ldots,M\}} \|H_k p_m^\chi\|^2$$

where $m_k$ denotes a preferred matrix index that includes a TPS selected by a $k^{th}$ reception apparatus, $X_k$ denotes a preferred polarization index selected by the $k^{th}$ reception apparatus, and where an optimal TPS "$p_m^k$" is equivalent to a vector closest to a largest singular vector "$v_k$" of a polarization channel matrix "$H_k$" being selected from a plurality of M predefined TPSs, and transmitting the at least one polarization-controlled transmission layer using orthogonal linear polarization.

16. The wireless communication method of claim 15, further comprising, selecting the at least one reception apparatus having a maximum scheduling priority based on the TPS index and the channel quality information received from the at least one reception apparatus.

17. The wireless communication system of claim 6, further comprising an other wireless communication device configured to receive the preferred polarization index and the preferred matrix index from a plurality of communication devices and select two or more communication devices from the plurality of communication devices which satisfy a predetermined scheduling reference and in which the transmission rate sum of the selected two or more communication devices is a maximum, where the transmission rate sum is calculated using the preferred matrix index, the preferred polarization index and channel quality index of the two or more selected communication devices.

* * * * *